A. F. BERRY.
COOKING DEVICE.
APPLICATION FILED MAY 6, 1914.

1,178,290. Patented Apr. 4, 1916.

Witnesses:
Marcus L. Byng
J. Ellis Glen

Inventor:
Arthur F. Berry,
by Albert G. Davis
Att'y.

UNITED STATES PATENT OFFICE.

ARTHUR FRANCIS BERRY, OF EALING, ENGLAND, ASSIGNOR TO GENERAL ELECTRIC COMPANY, A CORPORATION OF NEW YORK.

COOKING DEVICE.

1,178,290.   Specification of Letters Patent.   Patented Apr. 4, 1916.

Application filed May 6, 1914. Serial No. 836,658.

*To all whom it may concern:*

Be it known that I, ARTHUR FRANCIS BERRY, a subject of the King of Great Britain, residing at Ealing, England, have invented certain new and useful Improvements in Cooking Devices, of which the following is a specification.

When using unprotected electric and other cooking apparatus, such for example as is used for grilling, frying, boiling and like operations, the ascending air is mixed with vapors and oily particles that become disseminated through the air of the rooms or apartment in which the cooking is effected and ultimately become deposited on the walls of the room or apartment and upon furniture and other articles therein.

Now this invention has for its object to obviate, as far as possible, this disadvantage. For this purpose, the cooking device consisting of an electric or other grilling, frying or like cooking or heating apparatus (hereinafter referred to for brevity as the electric grill) is surmounted by a hood or casing communicating at the top with downwardly extending passages or flues and provided with purifying means, such as filtering, absorbent or depositing means or surfaces through, past or over which the air with vapor and oily particles will be caused to pass in close contact therewith so that the oily and other solid matter in suspension will be removed thereby from the air which will descend in a more or less purified condition through the air passages or flues. The air thus purified may be delivered to the electric grill so as to again pass over the same the heated air being thus caused to circulate to a large extent and be cleaned during such circulation. To assist the flow or circulation of the air, one or more small fans may be used. The air passages may be arranged at the sides and back of the hood or casing, the upper part of the front of which may be provided with a window or shutter to partly or wholly close the same.

Electric grills embodying the invention can be constructed in various forms, one of which is illustrated in the accompanying drawings which will be referred to in further describing the invention.

Figure 1:
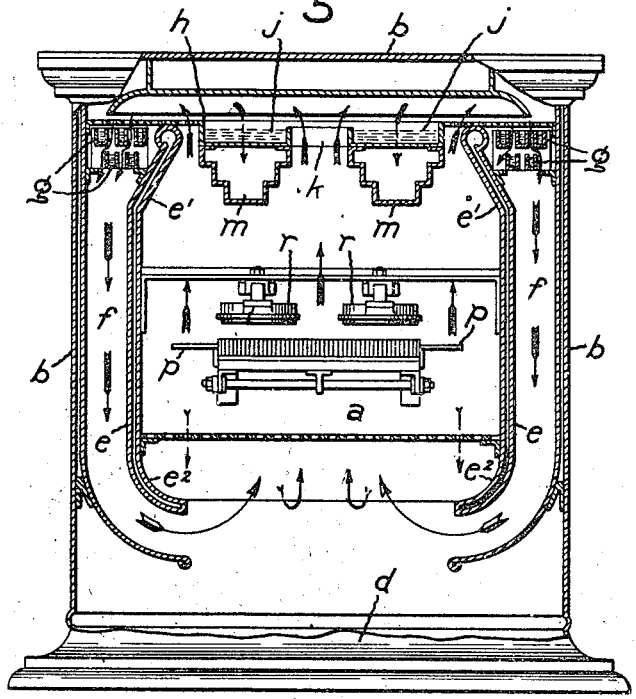
Figure 2:
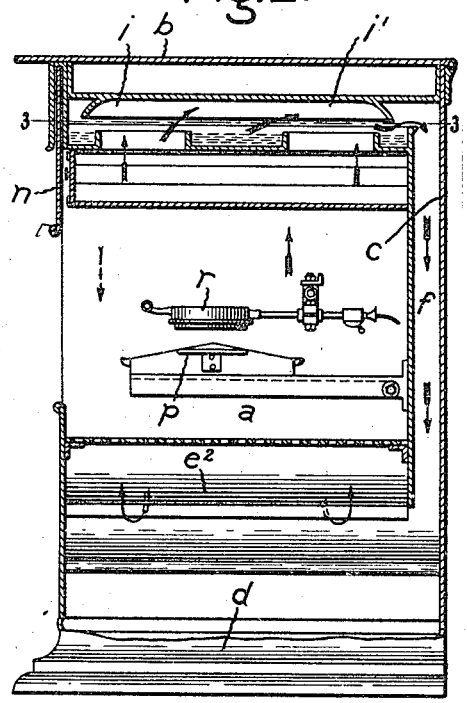
Figure 3:
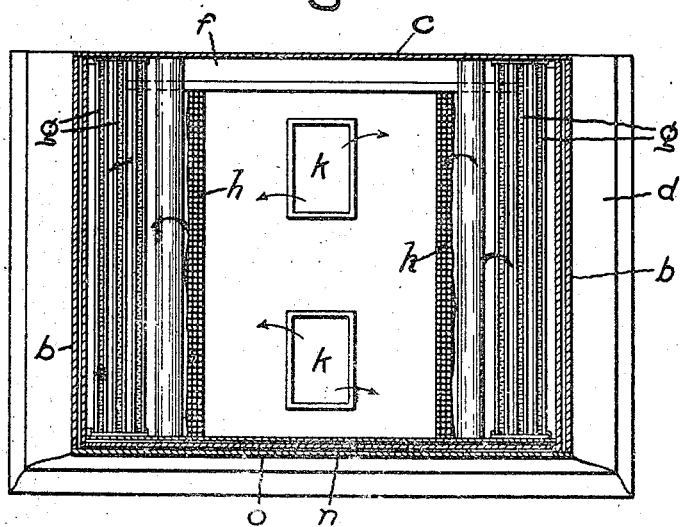

In the drawings, Figure 1 is a sectional view from the front showing the parts in elevation; Fig. 2 is a vertical section at right angles to Fig. 1, and Fig. 3 is a transverse section taken on the line 3—3 of Fig. 2.

Referring to these figures, the grill $a$ may be arranged within a hood or casing comprising a top and two sides $b$ and a back $c$ fixed upon a suitable base $d$ and provided internally with upwardly extending partitions $e$ arranged to form with the sides and back of the hood or casing vertical air passages $f$. These passages $f$ may be made with double walls as indicated. The upper ends $e^1$ of the side partitions $e$ may be inclined or extended inwardly so as to impart a flared or enlarged entrance to the air passages while the lower ends $e^2$ of the side partitions may be curved downward and inward and have baffle plates associated with them with the object of directing the down-flowing air inward and below the electric grilling device $a$ or devices. As exemplified, the linings of the side walls $b$ are curved to constitute baffles associated with the curved ends $e^2$ of the partitions. In the upper enlarged end portions of the air passages are arranged water troughs $g$ in staggered relationship one below another, or filtering or absorbent devices, as for example sheets or tufts of woven or unwoven fibrous material, so that the air with impurities will be brought into close contact therewith for the purpose hereinbefore explained. Above the grilling device $a$ the upper portion of the hood or casing is or may be provided with one or more perforated shelves, in this case a shelf $h$, arranged to form with a plate $i$ of the hood or casing an air space, or chamber $i^1$, through which the heated impure air from the grilling apparatus passes to the air cleaning or purifying devices $g$ and thence to the downwardly extending air passages $f$. To facilitate and direct this flow of air, one or more guide plates, say a plate $i$, may be used and guide or baffle plates may be arranged to avoid the presence of air pockets in the upper part of the hood or casing.

The upper side of the shelf $h$, or each shelf if more than one be used, may be adapted to form a water trough $j$ surrounding openings $k$. The underside of the shelf $h$, or shelves, may carry one or more sheet metal receptacles $m$, conveniently of stepped cross-section as shown in Fig. 1 and suitable for the reception of plates or other articles it may be desired to warm or keep hot and between which and the partitions $e^1$ the heated air will flow into the space or chamber above.

The upper portion of the front side of the hood or casing may be provided with a vertically movable window or shutter arranged to work in suitable guides so that during cooking the window or shutter can be drawn down to a suitable extent or can be pushed up more or less into the air space or chamber above, or into a pocket in front of such space or chamber, to suit requirement. In the drawings such a shutter *n* is shown as arranged to enter a pocket *o*.

The grilling device *a* may be made vertically adjustable and be provided at one or at each side with a toasting slab *p* over which can be brought an upper movable grilling device *r* that may be adapted, on its upper side to carry food or other articles to be cooked, heated or kept hot.

Any of the parts within the hood or casing may be arranged to be readily removed therefrom for cleaning and for being replaced for use.

Air cleaning means such as above described can be used with gas heated grilling and like apparatus.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is:—

1. An inclosed cooking apparatus comprising an outer casing, baffle or partition plates forming a central chamber and with the casing side passages communicating with the central chamber above and below, a cooking device mounted in the central chamber, and a perforated transverse plate seated against the upper ends of the baffle plates and formed as a trough for receiving a purifying liquid for the gases.

2. An inclosed cooking apparatus comprising an outer casing, baffle or partition plates forming a central chamber and with the casing side passages communicating with the central chamber above and below, a cooking device mounted in the central chamber, a perforated transverse plate seated against the upper ends of the baffle plates and formed as a trough for receiving a purifying liquid for the gases, and liquid troughs arranged at the upper ends of the side passages.

3. An inclosed cooking apparatus comprising an outer casing, baffle or partition plates forming a central chamber and with the casing side passages communicating with the central chamber above and below, a cooking device mounted in the central chamber, a perforated transverse plate seated against the upper ends of the baffle plates and formed as a trough for receiving a purifying liquid for the gases, liquid troughs arranged at the upper ends of the side passages, and a plate located above said transverse plate, for directing the gases to the side passages.

4. An inclosed cooking apparatus comprising an outer casing, baffle or partition plates forming a central chamber and with the casing side passages communicating with the central chamber above and below, a cooking device mounted in the central chamber, a perforated transverse plate seated against the upper ends of the baffle plates and formed as a trough for receiving a purifying liquid for the gases, and one or more inclosed receptacles secured to the under side of said transverse plate, where they will be engaged by the ascending gases.

In witness whereof, I have hereunto set my hand this 22nd day of April, 1914.

ARTHUR FRANCIS BERRY.

Witnesses:
C. VIVIAN PURNAY,
O. J. WORTH.